United States Patent Office 2,942,041
Patented June 21, 1960

2,942,041

PRODUCTION OF METHYL INDENE

Paul M. Pitts, Jr., Media, Pa., and Frank G. Ciapetta, Silver Spring, Md., assignors to The Atlantic Refining Company, Philadelphia, Pa., a corporation of Pennsylvania No Drawing. Filed Apr. 9, 1958, Ser. No. 727,291

2 Claims. (Cl. 260—668)

This invention relates to a method for the catalytic conversion of tetralin into methyl indene and more particularly this invention is concerned with the conversion of tetralin into methyl indene in the presence of excess hydrogen under dehydroisomerization conditions with a catalyst consisting essentially of platinum associated with an active acidic metal oxide component.

Indenes in recent years have become exceedingly important as synthetic resin intermediates, for example, in the preparation of a large class of synthetics bearing the general designation of coumarone-indene copolymers. Numerous modifications to these resins have been proposed by employing various alkylated indenes, particularly the methyl indenes wherein the methyl group is attached to a carbon atom of the five membered ring. The synthesis of methyl indene, however, heretofore has not been particularly feasible on a commercial scale. In accordance with the instant invention, however, a method now has been found whereby tetralin (tetrahydronaphthalene) may be converted in a single stage to methyl indene by the use of a specific catalyst and in combination with dehydroisomerization conditions.

It is an object of this invention therefore to provide a method for the catalytic conversion of tetralin into methyl indene.

It is a further object of this invention to provide a method for the conversion of tetralin into methyl indene in the presence of an excess of hydrogen under dehydroisomerization conditions with a specific catalyst.

Further objects of this invention will be apparent from the description and claims that follow.

In accordance with the instant invention tetralin is dehydroisomerized into methyl indene by employing an excess of hydrogen and a catalyst consisting essentially of platinum associated with an active acidic metal oxide component together with certain reaction conditions.

Tetralin, or tetrahydronaphthalene as it is more descriptively termed, may be prepared according to classical methods by the hydrogenation of naphthalene by the use of sodium metal in amyl alcohol. Naphthalene also may be converted into tetralin by the use of hydrogen under high pressures at high temperatures in the absence of catalysts; in the presence of catalysts, however, it may be converted to tetralin by the use of hydrogen at lower pressures and temperatures. For example, platinum or palladium will promote hydrogenation of naphthalene to tetralin at room temperature and low pressures. Commercially, nickel is employed as the catalyst for the hydrogenation of naphthalene to tetralin although certain other processes employ nickel-cobalt-copper-manganese containing catalysts and other processes employ molybdenum catalysts. Quite often the naphthalene is contaminated with sulfur containing compounds which will poison some of the aforementioned catalysts and therefore it may be required that the naphthalene be purified prior to its conversion to tetralin.

The catalysts which are suitable for the promotion of the conversion of tetralin into methyl indene contain two active components, one being platinum and the other being an active acidic metal oxide component.

The active acidic metal oxide component is characterized by the fact that it has activity for the cracking of hydrocarbons and has exchangeable hydrogen ions in its structure. A particularly suitable example of such a compound is a commercial silica-alumina cracking catalyst wherein the alumina ranges between 7 and 30 percent by weight and the remainder being silica. Commercial cracking catalysts containing from 12 percent to 25 percent alumina by weight are particularly preferred. In addition to the silica-alumina, other oxide components such as silica-magnesia, silica-thoria, silica-zirconia, and various combinations of silica with these metallic oxides also may be used, for example, silica-alumina-magnesia, silica-alumina-thoria and the like. A variety of methods for preparing such components are known and published in the catalytic cracking art, and since this invention is not concerned with any specific method of preparing this component of the catalyst, it is unnecessary to elaborate further on this point.

A particularly preferred acidic metal oxide component is a commercial silica-alumina cracking catalyst which has had its activity altered. The activity of a cracking catalyst may be measured by a distillate-plus-loss (D+L) scale according to the method of Birkhimer et al., "A Bench Scale Test Method for Evaluating Cracking Catalysts," Proceedings of the American Petroleum Institute, Division of Refining, volume 27, (III), page 90 (1947). According to the Birkhimer et al. D+L activity measurement method, it would be possible to have a theoretical maximum D+L of 100; however, in general, the maximum D+L for a fresh synthetic silica-alumina cracking catalyst will range between 90 and 95. While there are a number of other methods of measuring the catalytic cracking activity of synthetic silica-alumina cracking catalysts which have been described in the literature, these methods employ a D+L measure having much lower values for a fresh silica-alumina cracking catalyst, usually of the order of 45 to 65 depending upon the particular test. According, when there is specified D+L scale having a practicable maximum activity of 90 to 95 the Birkhimer et al. method is being employed.

A number of methods for altering the cracking activity of synthetic silica-alumina cracking catalysts have been described; however, the preferred method for the catalyst of the instant invention is treatment of the catalyst with steam at temperatures of from 900° F. to 1400° F., at pressures ranging from atmospheric to several hundred pounds per square inch, for a period of time sufficient to provide the desired degree of alteration.

It has been found that the acidic metal oxide component most suitable for use in preparing the catalysts for promoting the conversion of tetralin to methyl indene should have an activity ranging between 35 D+L and 95 D+L, as measured by the Birkhimer et al. method, the most preferred range, however, being from 45 to 75 D+L.

The platinum may be deposited directly onto the acidic metal oxide component from an aqueous solution of one of its compounds; for example, it may be deposited from an aqueous solution of chloroplatinic acid, platinous tetrammino chloride, platinous tetrammino hydroxide, platinic hexammino hydroxide, platinic hexammino chloride, chloroplatinous acid, platinic chloride, ammonium chloroplatinate, and similar platinum-containing solutions.

After contacting the acidic metal oxide with the solution of the platinum compound, the excess solution, if any, is removed and the oxide component is dried. The platinum may be reduced to the metallic state by calcination with air at temperatures ranging between 500° F. and 1100° F., or treated with hydrogen at 400° F. to 1000° F., in accordance with well-known methods. The amount of the metallic platinum deposited on the acidic metal oxide component may range from 0.1 percent by weight to 2.5 percent by weight based on the weight of the final catalyst.

Alternatively, the platinum may be deposited on an inert carrier. The inert carrier upon which the platinum is deposited may be any one or a mixture of the commercially available aluminas, such as chi alumina, gamma alumina, eta alumina and alpha alumina mono-hydrate. These aluminas are described in the article "Thermal Transformations of Aluminas and Alumina Hydrates," by H. C. Stumpf, A. S. Russell, J. W. Newsome, and C. M. Tucker, in Industrial and Engineering Chemistry, volume 42, page 13928 et seq. (1950). In addition, other inert carriers may be employed such as magnesium oxide, calcium oxide, titanium oxide, silica gel, fuller's earth, kaolin, keiselguhr, diatomaceous earth, bauxite, and naturally occurring adsorbent clays. The various materials which may be used as the inert carrier differ in their ability to absorb or adsorb platinum compounds from solution and, therefore, these carriers are not all equally effective for the purpose of this invention. A particularly effective carrier is alumina having a surface area of from 50 to 400 square meters per gram as measured by the nitrogen adsorption method of Brunnauer, Emmett and Teller found in the Journal of the American Chemical Society, volume 60, pages 309 et seq. (1938).

The deposition of the platinum on the inert carrier may be made from the same aqueous solutions described above. The amount of platinum deposited upon the inert carrier should be in an amount such that the final catalyst will contain between 0.1 percent and 2.5 percent by weight of platinum based on the weight of the final catalyst. The platinum may be reduced to the metallic state either by air calcination or hydrogen reduction as has been described.

The acidic metal oxide component is physically admixed with the inert carrier upon which the platinum has been deposited and the mixture may be pelleted or extruded according to conventional methods to produce masses suitable for use in fixed bed reactors.

In order to pellet the mixture of components, it has been found that for best results, the individual components should first be reduced to a particle size of the order not exceeding one millimeter maximum cross sectional dimension, preferably, they are reduced to a powder capable of being passed through an 80 mesh U.S. Standard Sieve. It has been found that the carrier component upon which the platinum is deposited may range between 5 percent and 75 percent by weight of the final catalyst. The most preferred composite, however, is obtained when the weight of the carrier component is approximately that of the silica-alumina component, i.e., each component constitutes approximately 50 percent of the mixture by weight.

It will be noted that the catalysts which are suitable for this invention contain only two active components, i.e., the platinum and the acidic metal oxide. In those catalysts wherein the platinum is deposited upon an inert carrier it is necessary that the carrier be admixed intimately with the acidic metal oxide component so that this catalyst is, as far as its activity for promoting the conversion of tetralin into methyl indene, an association of platinum with an acidic metal oxide component which is equivalent to a catalyst produced by the direct deposition of platinum on the acidic metal oxide component.

The tetralin is passed over the catalyst in the presence of an excess of hydrogen one purpose of which is to prevent or materially reduce the formation of coke or carbonaceous deposits on the catalyst. The conversion proceeds at temperatures between 600° F. and 1000° F. under pressures between 100 and 750 pounds per square inch with a liquid hourly space velocity of from 0.5 to 10 volumes of liquid charge per volume of catalyst per hour and with a hydrogen to hydrocarbon mole ratio of from 2:1 to 40:1. It is preferred, however, to conduct the conversion at temperatures between 750° F. and 950° F. under pressures between 150 and 500 pounds per square inch with a liquid hourly space velocity of from 1.0 to 6.0 volumes of liquid charge per volume of catalyst per hour and with a hydrogen to hydrocarbon mole ratio of from 5:1 to 25:1.

The conversion reaction proceeds with a net production of hydrogen, and accordingly the excess hydrogen may be supplied to the process quite simply by recycling a portion of the product hydrogen which may be separated from the reactor effluent.

Since the catalyst employed in the process of this invention has a rather high initial cost it is preferred that the catalyst be used in fixed bed reactors. Moreover since the reaction is endothermic, the catalyst may be contained in a series of reactors with heaters between successive reactors.

The example which follows will serve to illustrate certain specific embodiments of the invention and demonstrate the usefulness of the method but it should not be construed as limiting the invention to the specific features set forth therein.

*Example 1*

A sample of pure tetralin (tetrahydronaphthalene) was passed over a catalyst prepared by depositing platinum from a chloroplatinic acid solution onto a commercial silica-alumina cracking catalyst (13 percent by weight alumina, 87 percent by weight silica) which had been steam treated to an activity level of 45 D+L as measured by the Birkhimer et al. method. After calcination to reduce the platinum to the metallic state, the catalyst contained 0.45 percent by weight of platinum. The tetralin was passed over this catalyst at a temperature of 800° F. under a pressure of 500 pounds per square inch with a space velocity of 1.0 and a hydrogen to hydrocarbon mol ratio of 20:1. The products (not loss basis) in weight percent were as follows:

| | Weight percent |
|---|---|
| Gas | 1.7 |
| Decalin | 9.8 |
| Tetralin | 39.4 |
| Naphthalene | 24.5 |
| Metyl indene | 24.6 |

These results show that substantial amounts of tetralin may be dehydroisomerized to methyl indene.

We claim:

1. A method for converting tetralin into methyl indene which comprises contacting the tetralin with a catalyst consisting essentially of platinum associated with a silica-alumina cracking component at a temperature between 600° F. and 1000° F., a pressure between 100 and 750 pounds per square inch, a liquid hourly space velocity between 0.5 and 10 volumes of charge per volume of catalyst per hour and a hydrogen to hydrocarbon mole ratio of between 2:1 and 40:1, the said silica-alumina cracking component having an alumina content of from 7 percent to 30 percent by weight and having a catalytic cracking activity within a range from 35 to 95 as compared wtih a theoretical maximum catalytic cracking activity of 100 and a practicable maximum catalytic cracking activity of between 90 and 95 on a distillate-plus-loss scale for the measurement of the catalytic cracking activity of a cracking catalyst and the said platinum ranging from 0.1 percent to 2.5 percent by weight based on the weight of the final catalyst.

2. A method for converting tetralin into methyl indene which comprises contacting the tetralin with a catalyst consisting essentially of a physical admixture of alumina on which has been deposited 0.1 percent to 2.5 percent by weight of platinum based on the weight of the final catalyst and a silica-alumina cracking component at a temperature between 600° F. and 1000° F., a pressure between 100 and 750 pounds per square inch, a liquid hourly space velocity between 0.5 and 10 volumes of charge per volume of catalyst per hour and a hydrogen to hydrocarbon mole ratio between 2:1 and 40:1, the said alumina and platinum component being present in an amount ranging between 5 percent and 75 percent by weight of the final catalyst and the said silica-alumina cracking component having an alumina content of from 7 percent to 30 percent by weight and having a catalytic cracking activity within a range from 35 to 95 as compared with a theoretical maximum catalytic cracking activity of 100 and a practicable maximum catalytic cracking activity of between 90 and 95 on a distillate-plus-loss scale for the measurement of the catalytic cracking activity of a cracking catalyst.

References Cited in the file of this patent

UNITED STATES PATENTS

| | | |
|---|---|---|
| 2,416,965 | Thomas et al. | Mar. 4, 1947 |
| 2,428,923 | Thomas et al. | Oct. 14, 1947 |
| 2,723,947 | Oblad et al. | Nov. 15, 1955 |
| 2,754,340 | Anderson, et al. | July 10, 1956 |
| 2,780,603 | Burton | Feb. 5, 1957 |
| 2,854,403 | Weisz | Sept. 30, 1958 |

OTHER REFERENCES

Orlow et al.: Berichte, volume 63 (1930), pp. 2179–2185 relied on.

UNITED STATES PATENT OFFICE

CERTIFICATE OF CORRECTION

Patent No. 2,942,041                                      June 21, 1960

Paul M. Pitts, Jr., et al.

It is hereby certified that error appears in the printed specification of the above numbered patent requiring correction and that the said Letters Patent should read as corrected below.

Column 2, line 41, for "According" read -- Accordingly --; column 4, line 39, for "not" read -- no --; line 47, for "Metyl" read -- Methyl --; line 63, for "wtih" read -- with --.

Signed and sealed this 29th day of November 1960.

(SEAL)
Attest:

KARL H. AXLINE
Attesting Officer

ROBERT C. WATSON
Commissioner of Patents